(12) United States Patent
Akselrod et al.

(10) Patent No.: US 10,180,618 B2
(45) Date of Patent: Jan. 15, 2019

(54) COHERENT UPCONVERSION OF LIGHT

(71) Applicant: Elwha LLC, Bellevue, WA (US)

(72) Inventors: Gleb M. Akselrod, Bellevue, WA (US);
David R. Smith, Durham, NC (US)

(73) Assignee: Elwha LLC

( * ) Notice: Subject to any disclaimer, the term of this patent is extended or adjusted under 35 U.S.C. 154(b) by 0 days.

(21) Appl. No.: 15/798,699

(22) Filed: Oct. 31, 2017

(65) Prior Publication Data

US 2018/0129115 A1 May 10, 2018

Related U.S. Application Data

(60) Provisional application No. 62/420,149, filed on Nov. 10, 2016, provisional application No. 62/420,213, filed on Nov. 10, 2016.

(51) Int. Cl.
| | | |
|---|---|---|
| *H04N 5/335* | (2011.01) | |
| *G02F 1/35* | (2006.01) | |
| *G02F 2/02* | (2006.01) | |
| *B82Y 20/00* | (2011.01) | |

(52) U.S. Cl.
CPC .............. *G02F 1/353* (2013.01); *G02F 2/02* (2013.01); *B82Y 20/00* (2013.01); *G02F 2203/10* (2013.01)

(58) Field of Classification Search
CPC ....................................................... G02F 1/353
See application file for complete search history.

(56) References Cited

U.S. PATENT DOCUMENTS

| | | |
|---|---|---|
| 7,582,870 B2 | 9/2009 | Lee et al. |
| 7,667,848 B2 | 2/2010 | Lee et al. |
| 8,334,976 B2 | 12/2012 | Carney et al. |
| 8,861,555 B2 | 10/2014 | Fermann et al. |
| 9,184,549 B2 | 11/2015 | Fermann et al. |
| 9,252,560 B2 | 2/2016 | Fermann et al. |
| 2005/0227063 A1 | 10/2005 | Lawandy |
| 2016/0007859 A1 | 1/2016 | Arbabian et al. |

OTHER PUBLICATIONS

Arbabi, Amir et al., "An optical metasurface planar camera", Physics Optics, Apr. 21, 2016, pp. 1-29.
(Continued)

*Primary Examiner* — Gary C Vieaux

(57) ABSTRACT

Embodiments include an apparatus and method. An apparatus includes a metasurface that coherently upconverts light waves having a first frequency $f_1$. A substrate forms a first plasmonic surface. A plasmonic nanoparticle forms a second plasmonic surface. A layer of a second-order nonlinear dielectric material is disposed between the first plasmonic surface and the second plasmonic surface. The metasurface has at least three plasmonic resonant modes including a first plasmonic resonant mode having a first frequency $f_1$, a second plasmonic resonant mode having a second frequency $f_2$, and a third plasmonic resonant mode having a third frequency $f_3$ that is a sum of the first frequency $f_1$ and the second frequency $f_2$. The apparatus includes a second light propagation path from a source of pumped monochromatic coherent light waves having the second frequency $f_2$ to the metasurface. A digital image capture device captures the generated light waves having the frequency $f_3$.

44 Claims, 8 Drawing Sheets

(56) References Cited

OTHER PUBLICATIONS

Capasso, Federico, "Flat Optics based on Metasurfaces", School of Engineering and Applied Sciences Harvard University, bearing a date of 2014, pp. 1-31, vol. 13, No. 139, USA
"Electromagnetic metasurface", Wikipedia, Jul. 20, 2016, pp. 1-4.
Lau, Ryan K.W. et al., "Continuous-wave mid-infrared frequency conversion in silicon nanowaveguides", Optics Letters, Apr. 1, 2011, pp. 1263-1265, vol. 36, No. 7, Optical Society of America.
"Sum frequency generation spectroscopy", Wikipedia, Jun. 30, 2016, pp. 1-5.
Wogan, Tim, "Lasers reconfigure the properties of novel metasurface", physicsworld.com, Aug. 5, 2016, pp. 1-3, Institute of Physics.
Yu, Nanfang et al., "Flat optics with designer metasurfaces", Nature Materials, Jan. 23, 2014, pp. 139-150, vol. 13, Feb. 2014, Macmillan Publishers Limited.
PCT International Search Report; International App. No. PCT/US2017/060638; dated Mar. 22, 2018; pp. 1-7.

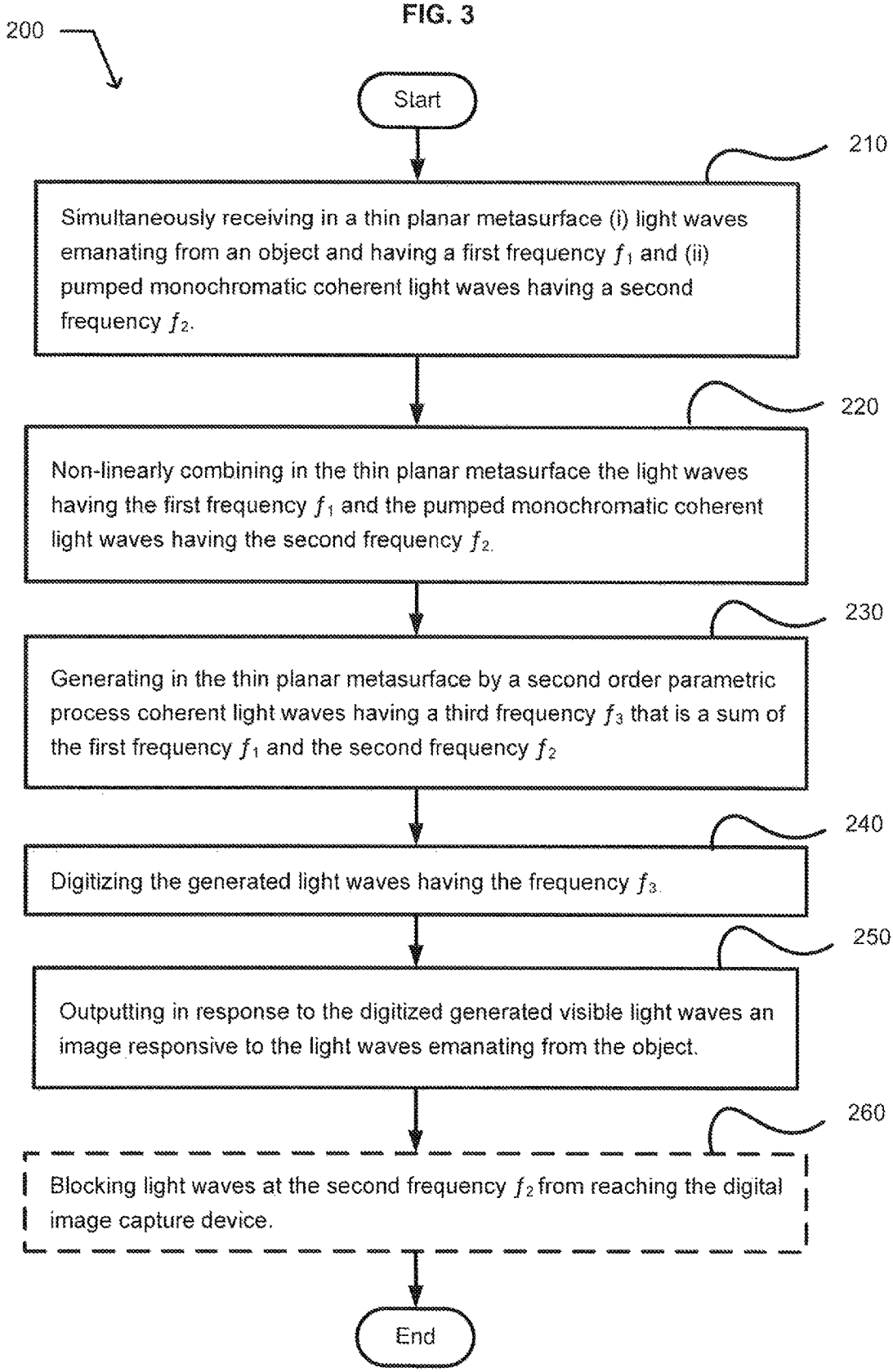

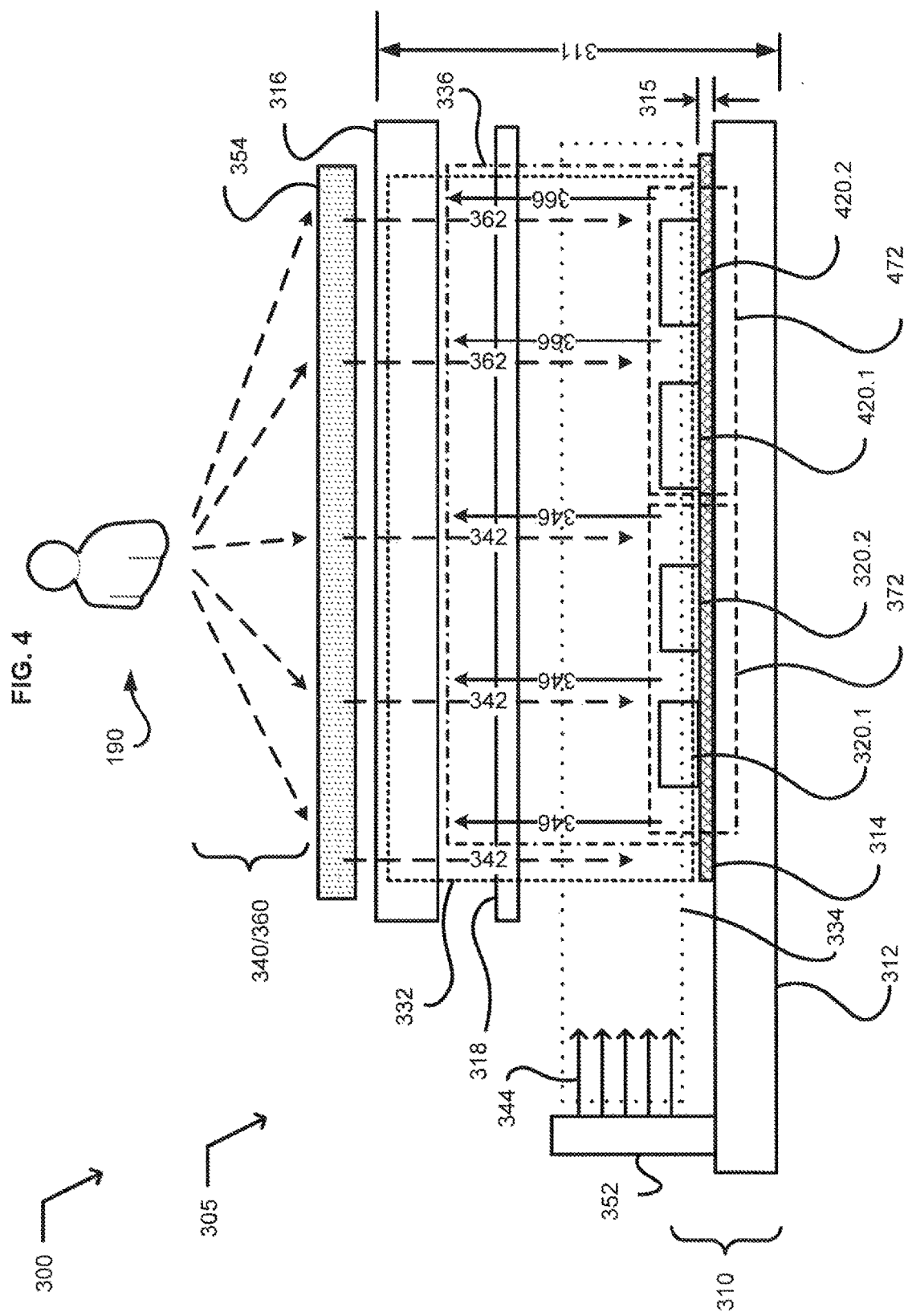

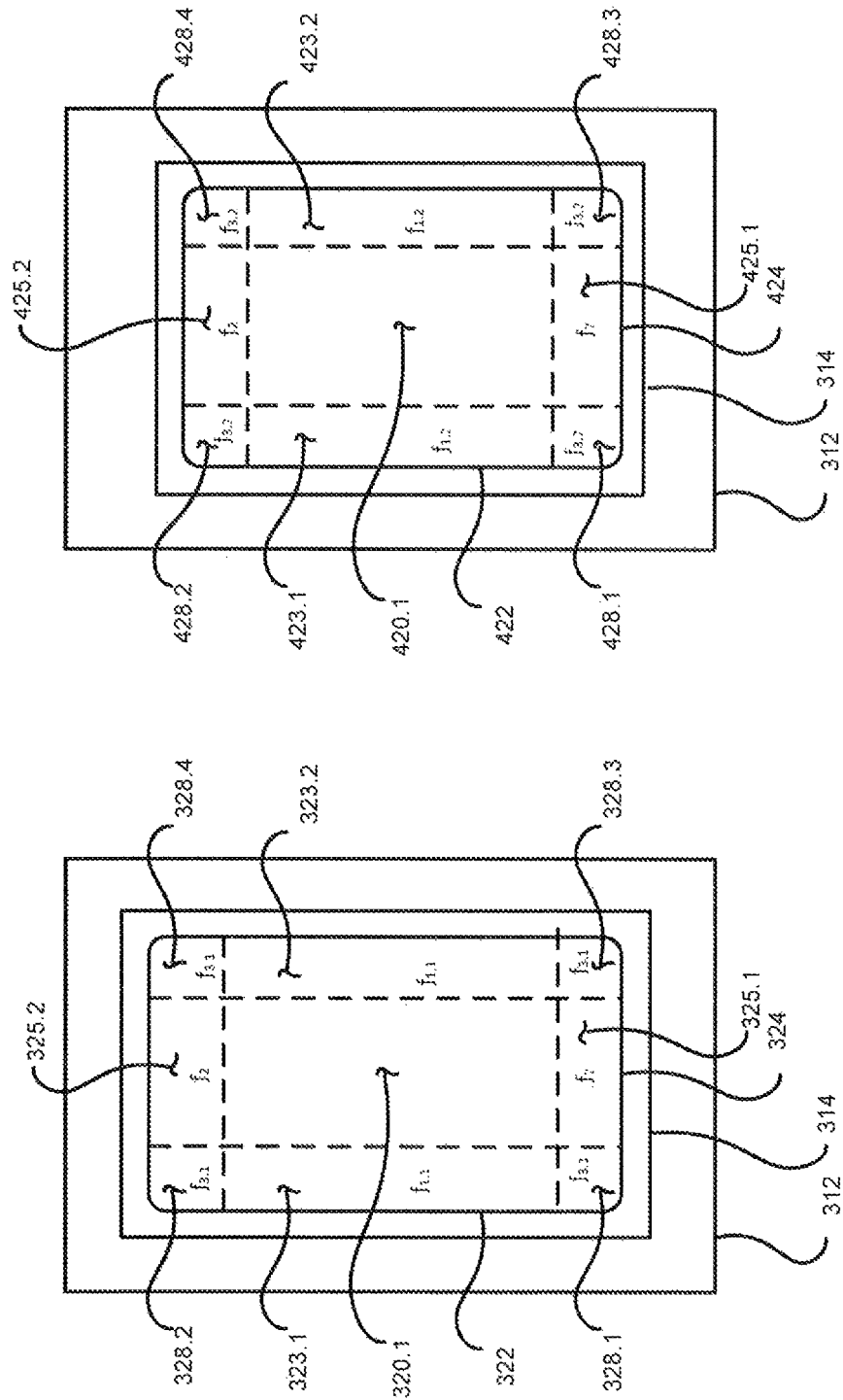

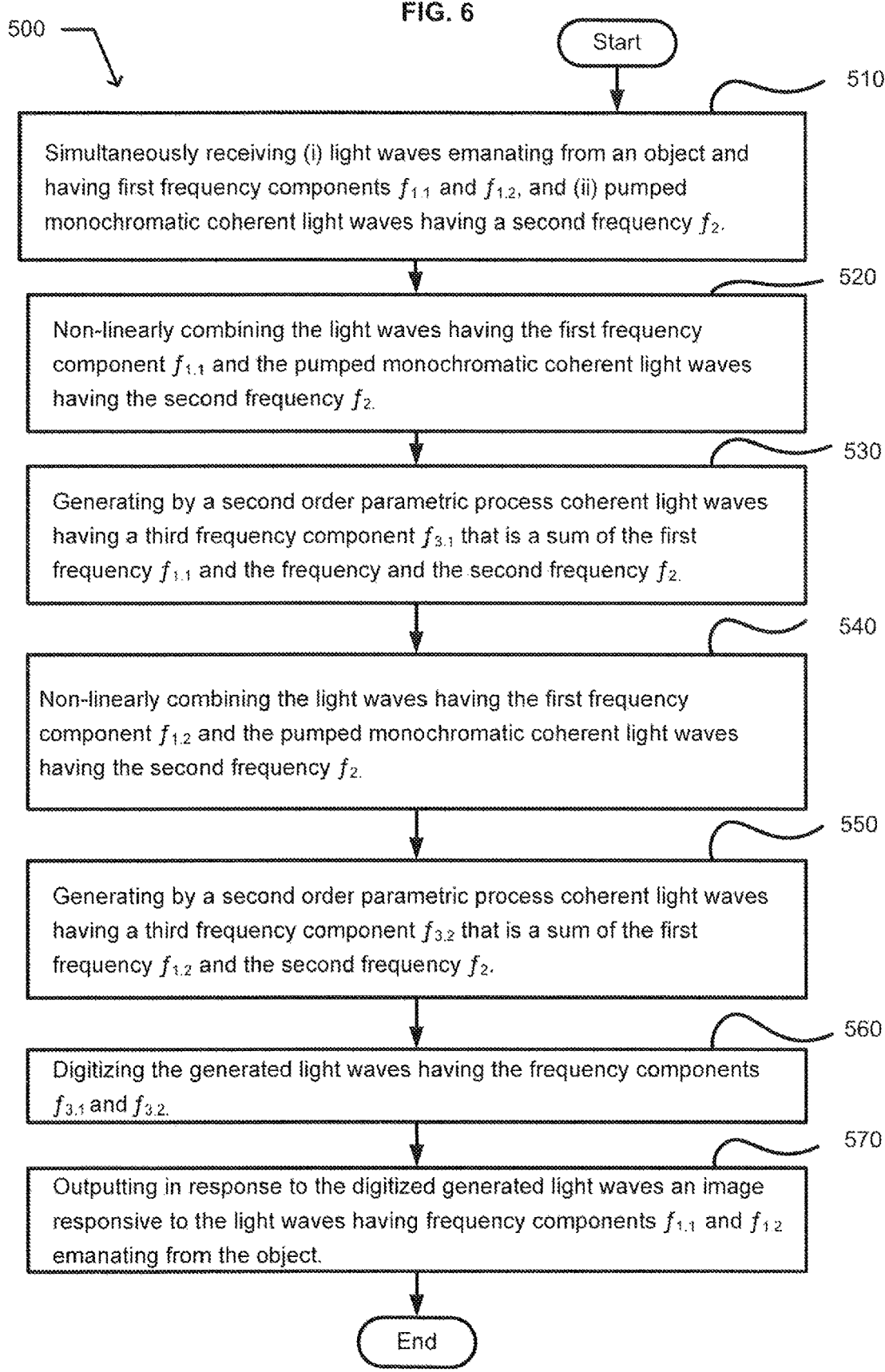

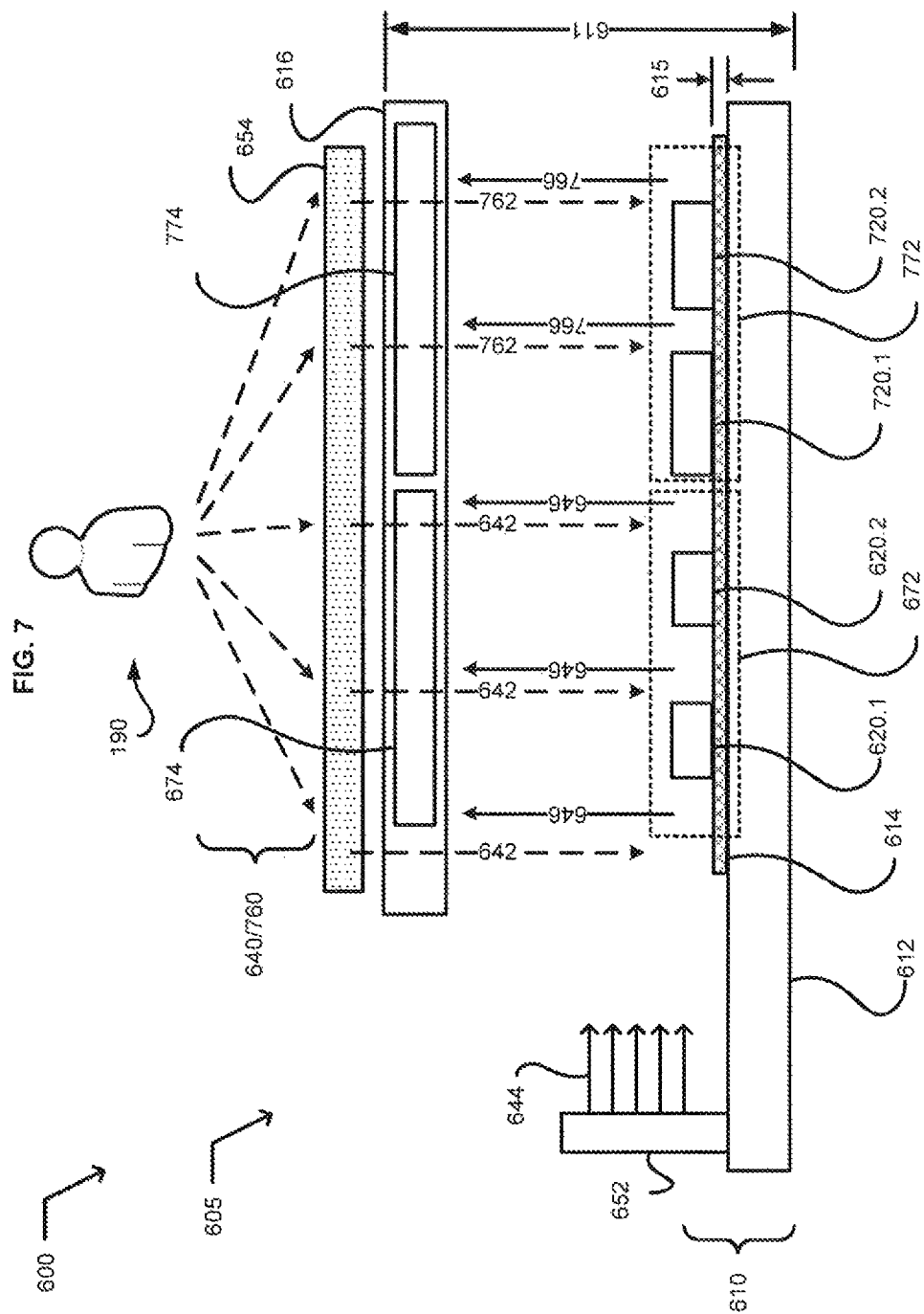

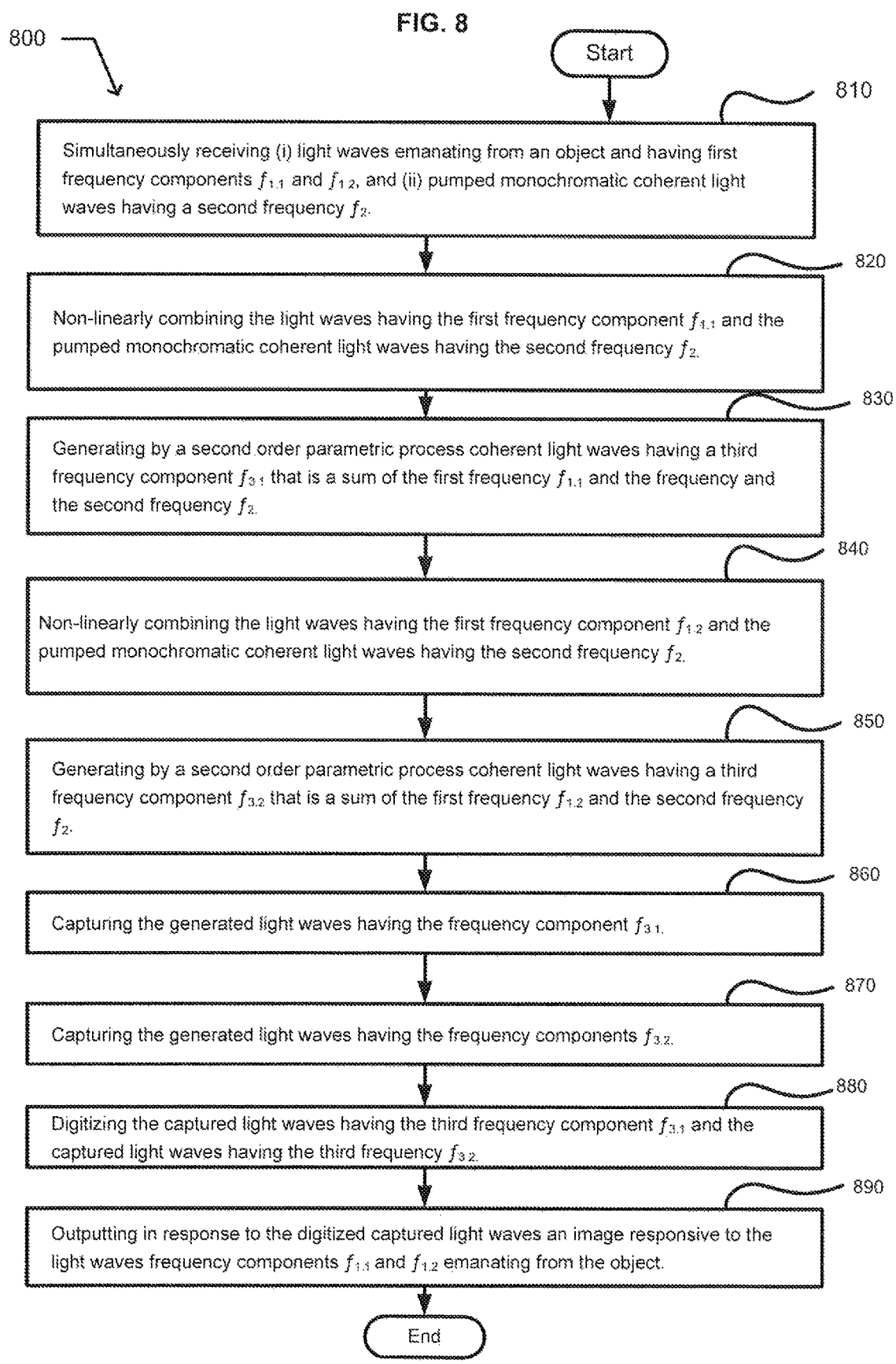

ations of the Priority Application(s)). In addition, the present
COHERENT UPCONVERSION OF LIGHT If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

The present application claims benefit of priority of U.S. Provisional Patent Application No. 62/420,149, entitled COHERENT UPCONVERSION OF LIGHT, naming GLEB M. AKSELROD and DAIVD R. SMITH as inventors, filed 10, Nov., 2016, which was filed within the twelve months preceding the filing date of the present application or is an application of which a currently co-pending priority application is entitled to the benefit of the filing date.

The present application claims benefit of priority of U.S. Provisional Patent Application No. 62/420,213, entitled COHERENT UPCONVERSION OF LIGHT, naming GLEB M. AKSELROD and DAIVD R. SMITH as inventors, filed 10, Nov., 2016, which was filed within the twelve months preceding the filing date of the present application or is an application of which a currently co-pending priority application is entitled to the benefit of the filing date.

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

For example, and without limitation, an embodiment of the subject matter described herein includes an apparatus. The apparatus includes a metasurface configured to coherently upconvert incident light waves emanating from an object and having a first frequency $f_1$. The metasurface includes a substrate having a first negative-permittivity layer comprising a first plasmonic surface. The metasurface includes a plasmonic nanoparticle having a base with a second negative-permittivity layer comprising a second plasmonic surface. The metasurface includes a dielectric layer comprising a second-order nonlinear dielectric material disposed between the first plasmonic surface and the second plasmonic surface. The metasurface is configured to form at least three plasmonic resonant modes in the dielectric layer. The at least three plasmonic resonant modes including a first plasmonic resonant mode having a first frequency $f_1$, a second plasmonic resonant mode having a second frequency $f_2$, and a third plasmonic resonant mode having a third frequency $f_3$. The metasurface is further configured to generate by a second order parametric process coherent light having the third frequency $f_3$ that is a sum of the first frequency $f_1$ and the second frequency $f_2$. The apparatus includes a second light propagation path from a source of pumped monochromatic coherent light waves having the second frequency $f_2$ to the metasurface. The apparatus includes a digital image capture device substantially transparent to light waves having the first frequency $f_1$ and configured to capture the generated light waves having the frequency $f_3$.

In an embodiment, the apparatus includes a first light propagation path transmitting the light waves emanating from the object and having the first frequency $f_1$ to the metasurface. In an embodiment, the apparatus includes a third light propagation path transmitting the generated light waves having the third frequency $f_3$ from the metasurface to the digital image capture device. In an embodiment, the apparatus includes a band block filter configured to block light at the second frequency $f_2$ and interposed in the third light propagation path between the metasurface and the digital image capture device. In an embodiment, the apparatus includes a source of pumped monochromatic coherent light waves having the second frequency $f_2$ and optically coupled with the second light propagation path. In an embodiment, the apparatus includes a lens configured to focus the light waves emanating from the object onto the metasurface.

In an embodiment, the metasurface includes a substrate having a first negative-permittivity layer comprising a first plasmonic surface. The metasurface includes at least two plasmonic nanoparticles, each plasmonic nanoparticle of the at least two plasmonic nanoparticles having a respective base with a second negative-permittivity layer comprising a second plasmonic surface. The dielectric layer includes a second-order nonlinear material disposed between the first plasmonic surface and the respective second plasmonic surface of each of the at least two plasmonic nanoparticles. The metasurface is configured to form at least three plasmonic resonant modes in the dielectric layer, the at least three plasmonic resonant modes including a first plasmonic resonant mode having a first frequency $f_1$, a second plasmonic resonant mode having a second frequency $f_2$, and a third plasmonic resonant mode having a third frequency $f_3$. The metasurface is further configured to generate by a second order parametric process coherent light waves having the third frequency $f_3$ that is a sum of the first frequency $f_1$ and the second frequency $f_2$.

For example, and without limitation, an embodiment of the subject matter described herein includes an apparatus. The apparatus includes a metasurface configured to coherently upconvert light waves emanating from an object and having a first frequency $f_1$. The metasurface includes a substrate having a first negative-permittivity layer comprising a first plasmonic surface. The metasurface includes a plasmonic nanoparticle having a base with a second negative-permittivity layer comprising a second plasmonic surface. The metasurface includes a dielectric layer comprising a second-order nonlinear dielectric material disposed between the first plasmonic surface and the second plasmonic surface. The metasurface is configured to form at least three plasmonic resonant modes in the dielectric layer, the at least three plasmonic resonant modes including a first plasmonic resonant mode having the first frequency $f_1$, a second plasmonic resonant mode having a second frequency $f_2$, and a third plasmonic resonant mode having a third frequency $f_3$. The metasurface is further configured to generate by a second order parametric process coherent light waves with a frequency having the third frequency $f_3$ that is a sum of first frequency $f_1$ and the second frequency $f_2$. The apparatus includes a first light propagation path transmitting the light waves emanating from the object and having the first frequency $f_1$ to the metasurface. The apparatus includes a pumped laser outputting a monochromatic coherent light having the second frequency $f_2$. The apparatus includes a second light propagation path transmitting monochromatic coherent light having the second frequency $f_2$ from the pumped laser to the metasurface. The apparatus includes a digital image capture device substantially transparent to the light waves having the first frequency $f_1$, and configured to (i) capture the generated light waves having the third frequency $f_3$ and (ii) output an image responsive to the light waves emanating from the object. The apparatus includes a third light propagation path transmitting the generated light waves having the third frequency $f_3$ from the metasurface to the digital image capture device.

For example, and without limitation, an embodiment of the subject matter described herein includes a method. The method includes simultaneously receiving in a thin planar metasurface (i) light waves emanating from an object and having a first frequency $f_1$ and (ii) pumped monochromatic coherent light waves having a second frequency $f_2$. The method includes non-linearly combining in the thin planar metasurface the light waves having the first frequency $f_1$ and the pumped monochromatic coherent light waves having the second frequency $f_2$. The method includes generating in the thin planar metasurface by a second order parametric process coherent light waves having a third frequency $f_3$ that is a sum of the first frequency $f_1$ and the second frequency $f_2$. The method includes digitizing the generated light waves having the frequency $f_3$. The method includes outputting in response to the digitized generated light waves a digital image responsive to the light waves emanating from the object. In an embodiment, the method includes blocking light waves at the second frequency $f_2$ from reaching the digital image capture device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 3 illustrates an example operational flow;

FIG. 4 schematically illustrates an example environment in which embodiments may be implemented;

FIG. 5 schematically illustrates a top view of an embodiment of the first plasmonic nanoparticle, illustrated by the plasmonic nanoparticle, and the second plasmonic nanoparticle, illustrated by the plasmonic nanoparticle;

FIG. 6 illustrates an example operational flow;

FIG. 7 illustrates an environment that includes the object and an apparatus; and FIG. 8 illustrates an example operational flow.

DETAILED DESCRIPTION

Figure 1:
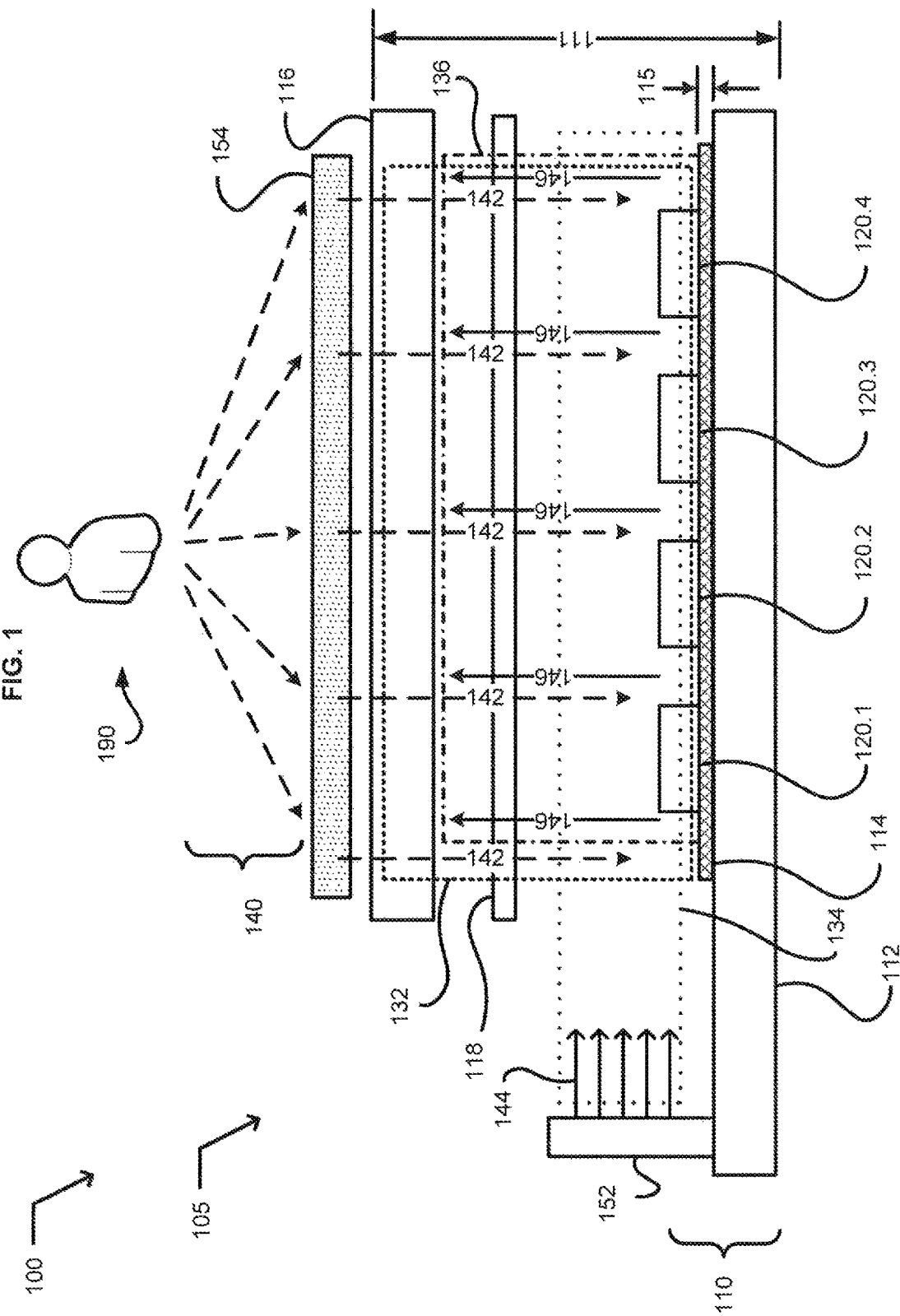
FIG. 1 schematically illustrates an example environment in which embodiments may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various implementations by which processes and/or systems and/or other technologies described herein can be effected (e.g., hardware, software, and/or firmware), and that the preferred implementation will vary with the context in which the processes and/or systems and/or other technologies are deployed. For example, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. Hence, there are several possible implementations by which the processes and/or devices and/or other technologies described herein may be effected, none of which is inherently superior to the other in that any implementation to be utilized is a choice dependent upon the context in which the implementation will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to implement an operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively, or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described below. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, module, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will also recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will further recognize that at least a portion of the devices and/or processes described herein can be integrated into an image processing system. A typical image processing system may generally include one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch-sensitive screen or display surface, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will likewise recognize that at least some of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch-sensitive screen or display surface, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Computer-readable media may include any media that can be accessed by a computing device and include non-transitory media, both volatile and nonvolatile media, and removable and non-removable media. By way of example, and not of limitation, computer-readable media may include computer storage media. Computer storage media includes non-volatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device. In a further embodiment, a computer storage media may include a group of computer storage media devices. In another embodiment, a computer storage media may include an information store. In another embodiment, an information store may include a quantum memory, a photonic quantum memory, or atomic quantum memory. Combinations of any of the above may also be included within the scope of computer-readable media.

In certain instances, one or more elements of disclosed embodiments may be deemed not necessary and omitted. In other instances, one or more other elements of disclosed embodiments may be deemed necessary and added.

FIG. 1 schematically illustrates an example environment 100 in which embodiments may be implemented. The environment includes an apparatus 105 and an object to be imaged 190. While the object is illustrated as a human, in other embodiments the object may include for example an animal, a tissue sample, a material, a composition, vehicle, or an airborne device. The apparatus 105 includes a metasurface 110 configured to coherently upconvert incident light waves emanating from the object 190 and having a first frequency $f_1$. The incident light waves are schematically illustrated as light waves 142 within the apparatus, and as light waves 140 between the object 190 and the apparatus, which may be light waves in free space. In an embodiment, the first frequency $f_1$ is a frequency of infrared light waves. In an embodiment, the first frequency $f_1$ is a frequency of optical light waves. In an embodiment, the light waves emanating from the object include light waves emitted by, reflected from, or transmitted by the object. The metasurface includes a substrate 112 having a first negative-permittivity layer comprising a first plasmonic surface. In an embodiment, the metasurface includes an optically thin ($\ll f_1$) array of sub-wavelength size ($\ll\lambda$), and sub-wavelength ($\ll\lambda$) spaced plasmonic nanoparticles. In an embodiment, the metasurface includes an optically thin subwavelength structured interface. The metasurface includes a plasmonic nanoparticle having a base with a second negative-permittivity layer comprising a second plasmonic surface. The plasmonic nanoparticle is schematically illustrated by plasmonic nanoparticle 120.1. In an embodiment, the metasurface may include at least two plasmonic nanoparticles, schematically illustrated by the plasmonic nanoparticles 120.1-120.4.

The metasurface 110 includes a dielectric layer 114 comprising a second-order nonlinear dielectric material disposed between the first plasmonic surface and the second plasmonic surface of the plasmonic nanoparticle, illustrated by the plasmonic nanoparticle 120.1. The dielectric layer has a thickness 115. The metasurface is configured to form at least three plasmonic resonant modes in the dielectric layer. The at least three plasmonic resonant modes including a first plasmonic resonant mode having the first frequency $f_1$, a second plasmonic resonant mode having a second frequency $f_2$, and a third plasmonic resonant mode having a third frequency $f_3$. The metasurface is further configured to generate by a second order parametric process coherent light waves having the third frequency $f_3$ that is a sum of the first frequency $f_1$ and the second frequency $f_2$. For example, in an embodiment, if the first frequency $f_1$ is 100 THz, and if the second frequency $f_2$ is 282 THz, the third frequency $f_3$ will be 382 THz.

The apparatus 105 includes a second light propagation path, schematically illustrated as second light propagation path 134, from a source 152 of pumped monochromatic coherent light waves 144 having the second frequency $f_2$ to the metasurface 110. In an embodiment, the second light propagation path may include a free space path. In an embodiment, the second light propagation path may include a light conductive medium, glass, or fiber path. In an embodiment, the second light propagation path may include a combination of at least two paths. For example, a combination path may include at least one of a free space, glass, or fiber paths. The apparatus includes a digital image capture device 116 substantially transparent to the light waves 140 and 142 having the first frequency $f_1$ and configured to capture the generated light waves having the frequency $f_3$. In an embodiment, substantially transparent includes greater than 90% transmission at the first frequency $f_1$. In an embodiment, substantially transparent includes greater than 80% transmission at the first frequency $f_1$. In an embodiment, substantially transparent includes greater than 60% transmission at the first frequency $f_1$. In an embodiment, substantially transparent includes greater than 40% transmission at the first frequency $f_1$. For example the substantial transparency of digital image capture device may be provided by Si, InGaAs, or other material having an energy band gap at $f_1$. In an embodiment, the digital image capture device may include a bulk-optics system.

In an embodiment, the apparatus 105 includes a first light propagation path, schematically illustrates as first light propagation path 132 transmitting the light waves 142 emanating from the object 190 and having the first frequency $f_1$ to the metasurface 110. In an embodiment, the first light propagation path may include a free space path. In an embodiment, the first light propagation path may include a light conductive medium, glass, or fiber path. In an embodiment, the first light propagation path may include a combination of at least two paths. For example, a combination path may include at least one of a free space, glass, or fiber paths. In an embodiment, the apparatus includes a third light propagation path, schematically illustrated as third light propagation path 136, transmitting the generated light waves 146 having the third frequency $f_3$ from the metasurface to the digital image capture device 116. In an embodiment, the apparatus includes a band block filter 118 configured to block light waves 144 at the second frequency $f_2$ and interposed in the third light propagation path 136 between the metasurface 110 and the digital image capture device 116. In an embodiment, the third light propagation path includes at least a portion of the first light propagation path 132 transmitting the light waves 142 emanating from the object 190 toward the metasurface.

In an embodiment, the apparatus 105 includes a source 152 of the pumped monochromatic coherent light waves 144 having the second frequency $f_2$ and optically coupled with the second light propagation path 134. In an embodiment, the source includes a pumped laser outputting the pumped monochromatic coherent light waves having the second frequency $f_2$. In an embodiment, the pumped laser includes a tunable pumped laser. In an embodiment, the apparatus includes a lens 154 configured to focus the light waves 140 emanating from the object 190 onto the metasurface 110. In an embodiment, the lens includes a flat or planar lens. In an embodiment, the lens includes a metamaterial lens. In an embodiment, the lens includes a bulk optics lens.

In an embodiment, the first plasmonic resonant mode frequency $f_1$ is spectrally separated from the second plasmonic resonant mode frequency $f_2$. In an embodiment, the first plasmonic resonant mode frequency $f_1$ is a function of a first characteristic of the plasmonic nanoparticle. The second plasmonic resonant mode frequency $f_2$ is a function of a second characteristic of the plasmonic nanoparticle. The third plasmonic resonant mode frequency $f_3$ is a function of both the first characteristic of the plasmonic nanoparticle and the second characteristic of the plasmonic nanoparticle. In an embodiment, the first characteristic of the plasmonic nanoparticle includes a first structural characteristic of the plasmonic nanoparticle and the second characteristic of the plasmonic nanoparticle includes a second structural characteristic of the plasmonic nanoparticle. In an embodiment, the first characteristic of the plasmonic nanoparticle includes a first dimensional characteristic of the plasmonic nanoparticle and the second characteristic of the plasmonic nanoparticle includes a second dimensional characteristic of the plasmonic nanoparticle.

Figure 2:
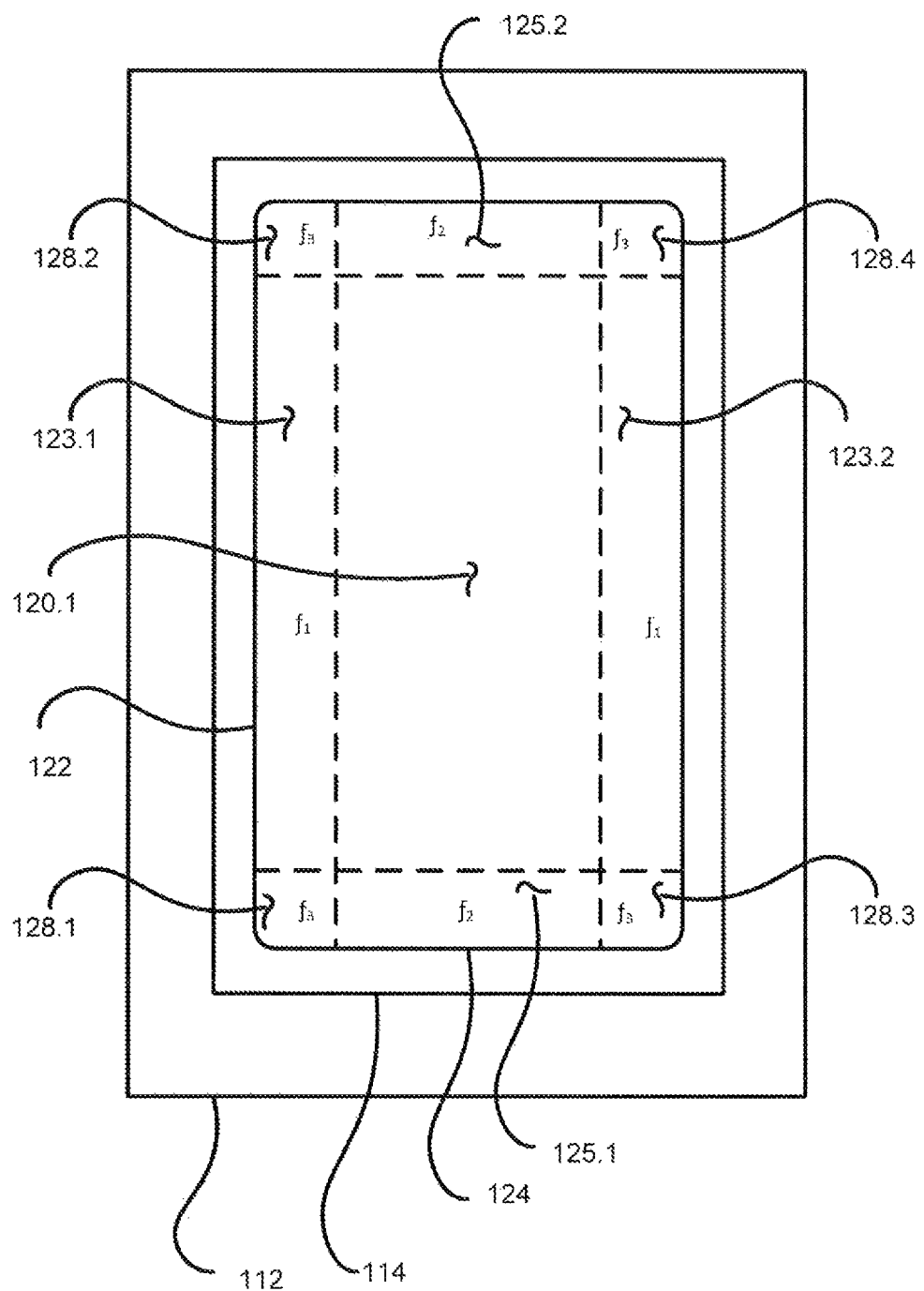
FIG. 2 schematically illustrates a top view of an embodiment of the plasmonic nanoparticle of the apparatus.

FIG. 2 schematically illustrates a top view of an embodiment of the plasmonic nanoparticle of the apparatus 105, illustrated by the plasmonic nanoparticle 120.1. In an embodiment, the first plasmonic resonant mode frequency $f_1$ is a function of a first side dimension 122 of a non-square rectangular base of the plasmonic nanoparticle. FIG. 2 schematically illustrates regions of the first plasmonic resonance mode as regions 123.1 and 123.2. In an embodiment, the second plasmonic resonant mode frequency $f_2$ is a function of a second side dimension 124 of the non-square rectangular base of the plasmonic nanoparticle. FIG. 2 schematically illustrates regions of the first plasmonic resonance mode as regions 125.1 and 125.2. In an embodiment, the third plasmonic resonant mode frequency $f_3$ is a function of both the first side dimension of the non-square rectangular base of the plasmonic nanoparticle and the second side dimension of the non-square rectangular base of the plasmonic nanoparticle. The schematic illustrations of the plasmonic resonance modes may or may not be representative of a location or locations of the actual the plasmonic resonance modes.

In an embodiment, the plasmonic nanoparticle, illustrated by the plasmonic nanoparticle 120.1, includes a base having a first characteristic, illustrated by the first side dimension 122, which in combination with the dielectric layer 114 establishes a first spatial mode at the first plasmonic resonant mode frequency $f_1$. The base has a second characteristic, illustrated by the second side dimension 124, which in combination with the dielectric layer establishes a second spatial mode at the second plasmonic resonant mode frequency $f_2$. The first spatial resonant mode and the second spatial resonant mode overlapping each other in the dielectric layer and creating the third plasmonic resonant mode having the third frequency $f_3$. The spatial overlapping regions or third plasmonic resonance modes are illustrated as regions 128.1-128.4. The respective schematic illustration of the plasmonic resonance modes may or may not be representative of actual the plasmonic resonance modes.

In an embodiment, the first side dimension 122 is greater than the thickness 115 of the dielectric layer 114 illustrated in FIG. 1. In an embodiment, the first side dimension is much greater than the thickness of the dielectric layer. For example, in an embodiment, "much greater" means the first side dimension is at least five times greater than the thickness of the dielectric layer. In an embodiment, the second side dimension 124 is greater than the thickness of the dielectric layer. In an embodiment, the second side dimension 124 is much greater than the thickness of the dielectric layer. For example, in an embodiment, "much greater" means the second side dimension is at least five times greater than the thickness of the dielectric layer. In an embodiment, the plasmonic nanoparticle includes a non-square rectangular base having (i) a first dimension characteristic that establishes a first spatial electromagnetic field mode at the first plasmonic resonant mode frequency $f_1$ and (ii) a second dimension characteristic that establishes a second spatial electromagnetic field mode at the second plasmonic resonant mode frequency $f_2$. The first spatial electromagnetic mode and the second spatial electromagnetic mode overlapping each other in the dielectric layer and creating the third plasmonic resonant mode having the third frequency $f_3$. In an embodiment, the base of the plasmonic nanoparticle includes a first dimension characteristic, for example the length of first side 122 that in combination with the dielectric layer establishes a first gap-plasmon guided mode. In an embodiment, the length of the first dimension is much greater than the thickness of dielectric gap. An example of a gap-plasmon guided mode is described in D. Smith, et al., Apparatus and method for providing a selectively absorbing structure, US 20150062686. In an embodiment, the base of the plasmonic nanoparticle includes a second dimension characteristic, for example the length of the second side 124, that in combination with the dielectric layer establishes a second gap-plasmon guided mode. In an embodiment, the length of the second dimension characteristic is much greater than the thickness of dielectric gap. The schematic illustrations of the plasmonic resonance modes may or may not be representative of actual the plasmonic resonance modes.

Returning to FIG. 1, in the metasurface 110, the first plasmonic resonant mode frequency $f_1$ and the second plasmonic resonant mode frequency $f_2$ are a function of the second-order nonlinear dielectric material of the dielectric layer 114 disposed between the first plasmonic surface of the substrate 112 and the second plasmonic surface of the plasmonic nanoparticle, illustrated by the plasmonic nanoparticle 120.1. In an embodiment, the digital image capture device is further configured to output a digital image responsive to the light waves 140 & 142 emanating from the object 190.

In an embodiment, the metasurface 110 includes the substrate 112 having a first negative-permittivity layer comprising a first plasmonic surface. The metasurface includes at least two plasmonic nanoparticles, illustrated by the four plasmonic nanoparticles 120.1-120.4. Each plasmonic nanoparticle of the at least two plasmonic nanoparticles having a respective base with a second negative-permittivity layer comprising a second plasmonic surface. The dielectric layer 114 including a second-order nonlinear material disposed between the first plasmonic surface and the respective second plasmonic surface of each of the at least two plasmonic nanoparticles. The metasurface is configured to form at least three plasmonic resonant modes in the dielectric layer. The at least three plasmonic resonant modes including a first plasmonic resonant mode having the first frequency $f_1$, a second plasmonic resonant mode having the second frequency $f_2$, and a third plasmonic resonant mode having the third frequency $f_3$. The metasurface is further configured to generate by a second order parametric process coherent light waves having the third frequency $f_3$ that is a sum of the first frequency $f_1$ and the second frequency $f_2$.

In an embodiment, both the substrate 112 and the base of the plasmonic nanoparticle 120.1 have a parallel planar geometry. In an embodiment, the metasurface 110 includes a planar metasurface. In an embodiment, the metasurface includes a flat panel metasurface. In an embodiment, the flat panel metasurface includes a curved flat panel metasurface. In an embodiment, the metasurface includes a metasurface formed on a silicon chip. In an embodiment, the metasurface includes a metasurface on a chip integrated platform.

In an embodiment, the apparatus 105 includes a planar apparatus. In an embodiment, the apparatus includes a flat panel apparatus. In an embodiment, the apparatus is formed on a silicon chip. In an embodiment, the apparatus is formed on a CMOS chip. In an embodiment, the apparatus includes on a chip integrated platform. In an embodiment, the apparatus has a thickness 111 less than 10 mm. In an embodiment, the apparatus has a thickness less than of 5 mm. In an embodiment, the apparatus has a thickness of less than 1 mm. In an embodiment, the apparatus has a thickness of less than 0.5 mm. In an embodiment, the metasurface 110 includes an optically thin metasurface. For example, an optically thin metasurface includes the metasurface having a subwavelength thickness relative to $f_1$ or $f_2$.

In an embodiment, the base of the plasmonic nanoparticle 120.1 is substantially conformal to the first plasmonic surface of the substrate 112. In an embodiment, the base of the plasmonic nanoparticle is substantially planar. In an embodiment, the base of the plasmonic nanoparticle has a major side, and a minor side shorter than the major side. In an embodiment, the major side corresponds to a base dimension in a first direction and the minor side corresponds to a shorter base dimension in a non-aligned second direction. In an embodiment, the non-aligned second direction is at least substantially perpendicular to the first direction. In an embodiment, the plasmonic nanoparticle includes at least two joined or proximate plasmonic nanoparticles forming the single base with a second negative-permittivity layer comprising the second plasmonic surface. In an embodiment, the at least two joined or proximate plasmonic nanoparticles form a non-square rectangular base with a second negative-permittivity layer comprising a second plasmonic surface. In an embodiment, the plasmonic nanoparticle includes a nanorod having a non-square rectangular base with the second negative-permittivity layer. In an embodiment, the base of the plasmonic nanoparticle includes at least one of a rectangular, an ellipsoidal, or a triangular shaped base. In an embodiment, the base of the plasmonic nanoparticle has an elongated shaped base. In an embodiment, the base of the plasmonic nanoparticle has an arbitrary shaped base. In an embodiment, the base of the plasmonic nanoparticle has a major side length between about 1000 and about 5000 nm. In an embodiment, the base of the plasmonic nanoparticle has a major side length between about 1500 and about 4000 nm. In an embodiment, the base of the plasmonic nanoparticle has a minor side length between about 500 and about 2000 nm.

In an embodiment, the dielectric layer 114 includes a dielectric layer region. In an embodiment, the dielectric layer includes a dielectric filled gap. In an embodiment, the second-order nonlinear dielectric material of the dielectric layer includes a potassium titanyl phosphate (KTP). In an embodiment, the second-order nonlinear dielectric material of the dielectric layer includes a lithium niobate ($LiNbO_3$). In an embodiment, the second-order nonlinear dielectric material of the dielectric layer includes a second order organic dielectric material. In an embodiment, the dielectric layer includes a non-linear optical material having a non-linear response configured to enhance emissions at the third frequency $f_3$. In an embodiment, the plasmonic nanoparticle includes a doubly-resonant plasmonic nanoparticle.

In an embodiment, the first negative-permittivity layer of the substrate 112 has negative permittivity within a defined frequency range. In an embodiment, the second negative-permittivity layer has negative permittivity within a defined frequency range. In an embodiment, the first negative-permittivity layer of the substrate includes a metallic layer. In an embodiment, the first negative-permittivity layer of the substrate includes a semi-metallic layer. In an embodiment, the first negative-permittivity layer of the substrate includes a semiconductor layer. In an embodiment, the first negative-permittivity layer of the substrate includes a polaritonic dielectric layer.

In an embodiment of the plasmonic nanoparticle 120.1, the second negative-permittivity layer includes a noble metal. In an embodiment, the second negative-permittivity layer includes a metallic layer. In an embodiment, the second negative-permittivity layer includes a semimetal layer. In an embodiment, the second negative-permittivity layer includes a semiconductor layer or a polaritonic dielectric layer.

In an embodiment, the dielectric layer 114 has a thickness 115 less than 100 nm. In an embodiment, the dielectric layer is less than 50 nm thick. In an embodiment, the dielectric layer is less than 25 nm thick. In an embodiment, the dielectric layer is less than 5 nm thick. In an embodiment, the dielectric layer is less than 2.5 nm thick. In an embodiment, the dielectric layer is greater than 5 nm. In an embodiment, the dielectric layer is greater than 5 nm and less than 50 nm thick.

FIG. 1 illustrates an alternative embodiment of the apparatus 105. The apparatus includes the metasurface 110 configured to coherently upconvert light waves emanating from an object and having a first frequency $f_1$. The metasurface the substrate 112 has a first negative-permittivity layer comprising a first plasmonic surface. The metasurface includes the plasmonic nanoparticle 120.1 having a base with a second negative-permittivity layer comprising a second plasmonic surface. The metasurface includes the dielectric layer 114 comprising a second-order nonlinear dielectric material disposed between the first plasmonic surface and the second plasmonic surface. The metasurface is configured to form at least three plasmonic resonant modes in the dielectric layer. The at least three plasmonic resonant modes including a first plasmonic resonant mode having the first frequency $f_1$, a second plasmonic resonant mode having the second frequency $f_2$, and a third plasmonic resonant mode having the third frequency $f_3$. The metasurface is further configured to generate by a second order parametric process coherent light waves having the third frequency $f_3$ that is a sum of the first frequency $f_1$ and the second frequency $f_2$. The apparatus includes the first light propagation path 132 transmitting the light waves 142 emanating from the object and having the first frequency $f_1$ to the metasurface. The apparatus includes the pumped laser 152 outputting a monochromatic coherent light 144 having the second frequency $f_2$. The apparatus includes the second light propagation path 134 transmitting the monochromatic coherent light having the second frequency $f_2$ from the pumped laser to the metasurface. The apparatus includes the digital image capture device 116 substantially transparent to light waves having the first frequency $f_1$, and configured to (i) capture the generated light waves having the third frequency $f_3$ and (ii) output a digital image responsive to the light waves emanating from the object. The apparatus includes the third light propagation path 136 transmitting the generated light waves having the third frequency $f_3$ from the metasurface to the digital image capture device.

FIG. 1 illustrates another alternative embodiment of the apparatus 105. The apparatus includes the metasurface 110 configured to coherently upconvert light waves emanating from an object and having a first frequency $f_1$. The metasurface the substrate 112 has a first negative-permittivity layer comprising a first plasmonic surface. The metasurface includes the plasmonic nanoparticle 120.1 having a base with a second negative-permittivity layer comprising a second plasmonic surface. The metasurface includes the dielectric layer 114 comprising a second-order nonlinear dielectric material disposed between the first plasmonic surface and the second plasmonic surface. The metasurface is configured to form at least three plasmonic resonant modes in the dielectric layer. The at least three plasmonic resonant modes including a first plasmonic resonant mode having the first frequency $f_1$, a second plasmonic resonant mode having the second frequency $f_2$, and a third plasmonic resonant mode having the third frequency $f_3$. The metasurface is further configured to generate by a second order parametric process coherent light waves having the third frequency $f_3$ that is a sum of the first frequency $f_1$ and the second frequency $f_2$.

FIG. 3 illustrates an example operational flow 200. After a start operation, the operational flow includes a reception operation 210. The reception operation includes simultaneously receiving in a thin planar metasurface (i) light waves emanating from an object and having a first frequency $f_1$ and (ii) pumped monochromatic coherent light waves having a second frequency $f_2$. In an embodiment, the reception operation may be implemented using the metasurface 110 described in conjunction with FIG. 1. In an embodiment, the first frequency $f_1$ is a frequency of infrared light waves. A resonant mode mixing operation 220 includes non-linearly combining in the thin planar metasurface the light waves having the first frequency $f_1$ and the pumped monochromatic coherent light waves having the second frequency $f_2$. In an embodiment, the resonant mode mixing operation may be implemented using the substrate 112, the plasmonic nanoparticle 120.1 and the dielectric layer 114 of the metasurface 110 described in conjunction with FIG. 1. A coherent upconversion operation 230 includes generating in the thin planar metasurface by a second order parametric process coherent light waves having a third frequency $f_3$ that is a sum of the first frequency $f_1$ and the second frequency $f_2$. In an embodiment, the coherent upconversion operation may be implemented using the substrate 112, the plasmonic nanoparticle 120.1 and the dielectric layer 114 of the metasurface 110 described in conjunction with FIG. 1. A capture operation 240 includes digitizing the generated light waves having the frequency $f_3$. In an embodiment, the capture operation may be implemented using the digital image capture device 116 described in conjunction with FIG. 1. A communication operation 250 includes outputting in response to the digitized generated light waves a digital image responsive to the light waves emanating from the object. In an embodiment, the communication operation may be implemented using the digital image capture device 116 described in conjunction with FIG. 1. The operational flow includes an end operation. In an embodiment, the thin planar metasurface includes a thin planar metasurface having a subwavelength thickness relative to $f_1$ or $f_2$. In an embodiment, the operational flow 200 includes blocking light at the second frequency $f_2$ from reaching the digital image capture device 260.

FIG. 4 schematically illustrates an example environment 300 in which embodiments may be implemented. The environment includes an apparatus 305 and the object to be imaged 190. In an embodiment, the apparatus has a thickness 311 of less than 10 mm. In an embodiment, the apparatus has a thickness of less than 5 mm. In an embodiment, the apparatus has a thickness of less than 1 mm. In an embodiment, the apparatus has a thickness of less than 0.5 mm. The apparatus 305 includes a metasurface 310 configured to coherently upconvert incident light waves emanating from the object 190 and having a first frequency components $f_{1.1}$ and $f_{1.2}$. The incident light waves are schematically illustrated as light waves 342 and 362 within the apparatus, and as light waves 340 and 360 between the object 190 and the apparatus, which may be light waves in free space. In an embodiment, the first frequency $f_1$ is a frequency of infrared light waves. In an embodiment, the first frequency $f_1$ is a frequency of optical light waves. In an embodiment, the light waves emanating from the object include light waves emitted by, reflected from, or transmitted by the object.

The metasurface 310 includes a substrate 312 having a first negative-permittivity layer comprising a first plasmonic surface. The metasurface includes at least two plasmonic nanoparticles, illustrated by a first plasmonic nanoparticle, schematically illustrated the first nanoparticle 320.1, and a second plasmonic nanoparticle, schematically illustrated by the second plasmonic nanoparticle 420.1. Each plasmonic nanoparticle has a respective base with a second negative-permittivity layer comprising a respective second plasmonic surface. The metasurface includes a dielectric layer 314 comprising a second-order nonlinear dielectric material disposed between the first plasmonic surface and the respective second plasmonic surface of each plasmonic nanoparticle of the at least two plasmonic nanoparticles. The dielectric layer has a thickness 315.

A first portion 372 of the metasurface 310 includes a first plasmonic nanoparticle of the at least two plasmonic nanoparticles, illustrated by the plasmonic nanoparticle 320.1. The first plasmonic nanoparticle is configured to form at least three plasmonic resonant modes in the dielectric layer. The at least three plasmonic resonant modes including a first plasmonic resonant mode having a first frequency component $f_{1.1}$, a second plasmonic resonant mode having a second frequency $f_2$, and a third plasmonic resonant mode having a third frequency component $f_{3.1}$. The first portion of the metasurface is further configured to generate by a second order parametric process coherent light waves having the third frequency component $f_{3.1}$ that is a sum of the first frequency component f and the second frequency $f_2$. For example, in an embodiment, if the first frequency component $f_{1.1}$ is 95 THz, if the second frequency component $f_2$ is 282 THz, the generated third frequency component $f_{3.1}$ will be 377 THz.

A second portion 472 of the metasurface 310 includes a second plasmonic nanoparticle of the at least two plasmonic nanoparticles, illustrated by the plasmonic nanoparticle 420.1. The second plasmonic nanoparticle is configured to form at least three plasmonic resonant modes in the dielectric layer. The at least three plasmonic resonant modes including a first plasmonic resonant mode having the first frequency component $f_{1.2}$, a second plasmonic resonant mode having a second frequency $f_2$, and a third plasmonic resonant mode having a third frequency component $f_{3.2}$. The second portion of the metasurface is further configured to generate by the second order parametric process coherent light waves having the third frequency component $f_{3.2}$ that is a sum of the first frequency component $f_{1.2}$ and the second frequency $f_2$. For example, in an embodiment, if the first frequency component $f_{1.2}$ is 100 THz, if the second frequency component $f_2$ is 282 THz, the generated third frequency component $f_{3.1}$ will be 387 THz. The metasurface includes a second light propagation path 334 from a source 352 of pumped monochromatic coherent light waves having the second frequency $f_2$ to the metasurface. The apparatus 305 includes a digital image capture device 316 substantially transparent to light waves having the first frequency components $f_{1.1}$ and $f_{1.2}$, and configured to separately capture the light waves having the third frequency components $f_{3.1}$ and $f_{3.2}$.

FIG. 5 schematically illustrates a top view of an embodiment of the first plasmonic nanoparticle, illustrated by the plasmonic nanoparticle 320.1, and the second plasmonic nanoparticle, illustrated by the plasmonic nanoparticle 420.1. In an embodiment, the first plasmonic nanoparticle includes a base having (i) a first characteristic 322 that in combination with the dielectric layer 314 establishes first spatial modes 323.1 and 323.2 at the frequency $f_{1.1}$ and (ii) a second characteristic 324 that establishes second spatial modes 325.1 and 325.2 at frequency $f_2$. The first spatial mode and the second spatial mode spatially overlapping each other in the dielectric layer and creating third plasmonic resonant modes 328.1-328.4 having the third frequency $f_3$. In an embodiment, the base of the first plasmonic nanoparticle has a first dimension characteristic 322, such as a length, that in combination with the dielectric layer 314 establishes a first gap-plasmon guided mode. In an embodiment, the first side dimension characteristic 322 includes a length that is much greater than a thickness of the dielectric layer 315. For example, in an embodiment, "much greater" means the first side dimension is at least five times greater than the thickness of the dielectric layer.

In an embodiment, the second plasmonic nanoparticle 420.1 includes a base having (i) a first characteristic 422 that in combination with the dielectric layer 314 establishes first spatial modes 423.1 and 423.2 at the frequency $f_{1.2}$ and (ii) a second characteristic 424 that in combination with the dielectric layer establishes second spatial modes 425.1 and 425.2 at the frequency $f_2$. The first spatial modes and the second spatial modes spatially overlapping each other in the dielectric layer and creating the third plasmonic resonant modes 428.1-428.4 having the third frequency $f_3$. In an embodiment, the base of the second plasmonic nanoparticle has a first dimension characteristic 422, such as a length, that in combination with the dielectric layer establishes a second gap-plasmon guided mode. In an embodiment, the first side dimension characteristic 422 includes a length that is much greater than the thickness of the dielectric layer 315. The schematic illustrations of the plasmonic resonance modes may or may not be representative of actual the plasmonic resonance modes.

Returning to FIG. 4, in an embodiment, the digital image capture device 316 includes a Foveon X3 array of layered pixel sensors responsive to the third frequency components $f_{3.1}$ and $f_{3.2}$. In an embodiment, the digital image capture device includes a Bayer filter pattern including interlaced grids responsive to the third frequency components $f_{3.1}$ and $f_{3.2}$. In an embodiment, the digital image capture device includes a CCD based separator responsive to the third frequency components $f_{3.1}$ and $f_{3.2}$. In an embodiment, the digital image capture device is further configured to output an image responsive to the light waves emanating from the object at the first frequency components $f_{1.1}$ and $f_{1.2}$. In an embodiment, the digital image capture device is further configured to output a digital image responsive to the light waves emanating from the object at the first frequency components $f_{1.1}$ and $f_{1.2}$.

In an embodiment, the apparatus 305 includes a first light propagation path 332 transmitting the light waves 342 and 362 emanating from the object 190 and having the first frequency components $f_{1.1}$ and $f_{1.2}$ to the metasurface 310. In an embodiment, the apparatus 305 includes a third light propagation path 336 transmitting the generated light waves 346 and 362 having the third frequency components $f_{3.1}$ and $f_{3.2}$ from the metasurface to the digital image capture device 316. In an embodiment, the apparatus includes a band block filter 318 configured to block light at the second frequency $f_2$ and interposed in the third light propagation path between the metasurface and the digital image capture device. In an embodiment, the third light propagation path includes at least a portion of a first light propagation path directing the light waves emanating from the object toward the metasurface. In an embodiment, the apparatus includes a source 352 of the pumped monochromatic coherent light waves having the second frequency $f_2$ and optically coupled with the second light propagation path 334. In an embodiment, the source includes a pumped laser outputting the pumped monochromatic coherent light waves having the second frequency $f_2$. In an embodiment, the apparatus includes a lens 354 configured to focus the light waves 340 and 360 emanating from the object 190 and having the first frequency components $f_{1.1}$ and $f_{1.2}$ onto the metasurface.

In an embodiment of the apparatus 305, the first portion 372 of the metasurface 310 includes at least two first plasmonic nanoparticles, illustrated as first plasmonic nanoparticles 320.1 and 320.2. In an embodiment, the second portion 472 of the metasurface includes at least two second plasmonic nanoparticles, illustrated as second plasmonic nanoparticles 420.1 and 420.2.

FIG. 6 illustrates an example operational flow 500. After a start operation, the operational flow includes a reception operation 510. The reception operation includes simultaneously receiving (i) light waves emanating from an object and having first frequency components $f_{1.1}$ and $f_{1.2}$, and (ii) pumped monochromatic coherent light waves having a second frequency $f_2$. In an embodiment, the first frequency components $f_{1.1}$ and $f_{1.2}$ are frequencies of light waves. In an embodiment, the reception operation may be implemented using the metasurface 310 described in conjunction with FIG. 4. A first resonant mixing operation 520 includes non-linearly combining the light waves having the first frequency component $f_{1.1}$ and the pumped monochromatic coherent light waves having the second frequency $f_2$. In an embodiment, the first resonant mixing operation may be implemented using the first portion 372 of the metasurface 310 described in conjunction with FIG. 4, including the plasmonic nanoparticle 320.1, the substrate 312, and the dielectric 314. A first coherent upconversion operation 530 includes generating by a second order parametric process coherent light waves having a third frequency component $f_{3.1}$ that is a sum of the first frequency $f_{1.1}$ and the frequency and the second frequency $f_2$. In an embodiment, the first coherent upconversion operation may be implemented using the first portion 372 of the metasurface 310 described in conjunction with FIG. 4, including the plasmonic nanoparticle 320.1, the substrate 312, and the dielectric 314. A second resonant mixing operation 540 includes non-linearly combining the light waves having the first frequency component $f_{1.2}$ and the pumped monochromatic coherent light waves having the second frequency $f_2$. In an embodiment, the second resonant mixing operation may be implemented using the second portion 472 of the metasurface 310, including the plasmonic nanoparticle 420.1, the substrate 312, and the dielectric 314. A second coherent upconversion operation 550 includes generating by a second order parametric process coherent light waves having a third frequency component $f_{3.2}$ that is a sum of the first frequency $f_{1.2}$ and the second frequency $f_2$. In an embodiment, the second coherent upconversion operation may be implemented using the second portion 372 of the metasurface 310 described in conjunction with FIG. 4, including the plasmonic nanoparticle 420.1, the substrate 312, and the dielectric 314. A capture operation 560 includes digitizing the generated light waves having the frequency components $f_{3.1}$ and $f_{3.2}$. In an embodiment, the digitizing operation may be implemented using the digital image capture device 316 described in conjunction with FIG. 4. A communication operation 570 includes outputting in response to the digitized generated light waves a digital image responsive to the light waves having the frequency components f and $f_{1.2}$ emanating from the object. In an embodiment, the communication operation may be implemented using the digital image capture device 316 described in conjunction with FIG. 4. The operational flow includes an end operation.

In an embodiment, the operational flow 500 includes blocking light at the second frequency $f_2$ from being digitized by the capture operation. In an embodiment, the operational flow includes focusing the light waves emanating from an object and having first frequency components $f_{1.1}$ and $f_{1.2}$.

FIG. 7 illustrates an environment 600 that includes the object 190 and an apparatus 605. The apparatus includes a metasurface 610 configured to coherently upconvert incident light waves emanating from the object 190 and respectively having first frequency components $f_{1.1}$ and $f_{1.2}$. The light waves as schematically illustrated as light waves 642 and 762 within the apparatus, and as light waves 640 and 760 between the object and the apparatus. In an embodiment, the first frequency components $f_{1.1}$ and $f_{1.2}$ are frequencies of infrared light waves. In an embodiment, the metasurface includes a substrate 612 having a first negative-permittivity layer comprising a substrate plasmonic surface. The metasurface includes a first metasurface pixel 672 comprising a first plasmonic nanoparticle 620.1 having a base with a negative-permittivity layer comprising a first pixel plasmonic surface. The metasurface includes a second metasurface pixel 772 comprising a second plasmonic nanoparticle 720.1 having a second base with a second negative-permittivity layer comprising a second pixel plasmonic surface. The metasurface includes a dielectric layer 614 comprising a second-order nonlinear dielectric material disposed between the substrate plasmonic surface and the respective first pixel plasmonic surface and the second pixel plasmonic surface. The dielectric layer has a thickness 615. The first metasurface pixel is configured to form at least three plasmonic resonant modes in the dielectric layer. The at least three plasmonic resonant modes including a first plasmonic resonant mode having the first frequency component $f_{1.1}$, a second plasmonic resonant mode having a second frequency $f_2$, and a third plasmonic resonant mode having a third frequency component $f_{3.1}$. The second metasurface pixel is configured to form at least three plasmonic resonant modes in the dielectric layer. The at least three plasmonic resonant modes including a first plasmonic resonant mode having the first frequency component $f_{1.2}$, a second plasmonic resonant mode having the second frequency $f_2$, and a third plasmonic resonant mode having a third frequency component $f_{3.2}$. The metasurface is configured to generate by a second order parametric process coherent light waves having the third frequency components $f_{3.1}$ and $f_{3.2}$ that are a sum of the first frequency components $f_{1.1}$ and $f_{1.2}$ and the second frequency $f_2$ respectively. The apparatus includes a second light propagation path from a source 652 of pumped monochromatic coherent light waves 644 having the second frequency $f_2$ to the metasurface. The second light propagation path is illustrated by the second light propagation path 334 described in conjunction with FIG. 4. The apparatus includes a digital image capture device 616 substantially transparent to light waves having the first frequency components $f_{1.1}$ and $f_{1.2}$. The digital image capture device includes a first capture pixel 674 configured to capture the light 646 having the third frequency component $f_{3.1}$ generated by the first metasurface pixel 672. The digital image capture device includes a second capture pixel 774 configured to capture the light 766 having the third frequency component $f_{3.2}$ generated by the second metasurface pixel. For example, in an embodiment, the digital image capture device may be configured to capture a color separated image, or a frequency separated image. In an embodiment, the apparatus has a thickness of less than 10 mm. In an embodiment, the apparatus has a thickness of less than 5 mm. In an embodiment, the apparatus has a thickness of less than 1 mm. In an embodiment, the apparatus has a thickness of less than 0.5 mm.

In an embodiment, the digital image capture device 616 includes a first capture pixel 674 configured and aligned to directly capture the light 646 having the third frequency component $f_{3.1}$ and a second capture pixel 774 configured and aligned to capture 766 light having the third frequency component $f_{3.2}$. In an embodiment, the digital image capture device is further configured to output an image responsive to the light waves emanating from the object 190 at the first frequency components $f_{1.1}$ and $f_{1.0}$. In an embodiment, the digital image generator is configured to output a digital image responsive to the light waves emanating from the object.

In an embodiment, the first metasurface pixel 672 includes at least two first plasmonic nanoparticles, illustrated by first plasmonic nanoparticles 620.1 and 620.2. Each first plasmonic nanoparticle having a respective base with a negative-permittivity layer comprising a portion the first pixel plasmonic surface. In an embodiment, the second metasurface pixel 772 includes at least two second plasmonic nanoparticles, illustrated by second plasmonic nanoparticles 720.1 and 720.2. Each second plasmonic nanoparticle having a respective base with a negative-permittivity layer comprising a portion the second pixel plasmonic surface.

In an embodiment, the apparatus 605 includes a first light propagation path transmitting the light waves emanating from the object 190 having the first frequency components $f_{1.1}$ and $f_{1.2}$ to the metasurface 610. The first light propagation path is illustrated by the first light propagation path 322 described in conjunction with FIG. 4. In an embodiment, the apparatus includes a third light propagation path transmitting the generated light waves having the third frequency components $f_{3.1}$ and $f_{3.2}$ from the metasurface to the digital image capture device. The third light propagation path is illustrated by the third light propagation path 336 described in conjunction with FIG. 4. In an embodiment, the apparatus includes a band block filter configured to block light at the second frequency $f_2$ and interposed in the third light propagation path between the metasurface and the digital image capture device. The band block filter is illustrated by the band block filter 318 described in conjunction with FIG. 4. In an embodiment, the apparatus includes a lens 774. In an embodiment, the lens 774 is similar to the lens 354 described in conjunction with FIG. 4.

FIG. 8 illustrates an example operational flow 800. After a start operation, the operational flow includes a reception operation 810. The reception operation includes simultaneously receiving (i) light waves emanating from an object and having first frequency components $f_{1.1}$ and $f_{1.2}$, and (ii) pumped monochromatic coherent light waves having a second frequency $f_2$. In an embodiment, the reception operation may be implemented using the metasurface 610 described in conjunction with FIG. 7. A first resonant mode mixing operation 820 includes non-linearly combining the light waves having the first frequency component $f_{1.1}$ and the pumped monochromatic coherent light waves having the second frequency $f_2$. In an embodiment, the first resonant mode mixing operation may be implemented using the first metasurface pixel 672 of the metasurface 610 described in conjunction with FIG. 7. A first coherent upconversion operation 830 includes generating by a second order parametric process coherent light waves having a third frequency component $f_{3.1}$ that is a sum of the first frequency component $f_{1.1}$ and the frequency of the second frequency $f_2$. In an embodiment, the first coherent upconversion operation may be implemented in the first metasurface pixel 672 of the metasurface 610 described in conjunction with FIG. 7. A second resonant mode mixing operation 840 includes non-linearly combining the light waves having the first frequency component $f_{1.2}$ and the pumped monochromatic coherent light waves having the second frequency $f_2$. In an embodiment, the second resonant mode mixing operation may be implemented using the second pixel 772 of the metasurface 610 described in conjunction with FIG. 7. A second coherent upconversion operation 850 includes generating by a second order parametric process coherent light waves having a third frequency component $f_{3.2}$ that is a sum of the first frequency $f_{1.2}$ and the second frequency $f_2$. In an embodiment, the second coherent upconversion operation may be implemented in the second metasurface pixel 772 of the metasurface 610 described in conjunction with FIG. 7. A first imaging operation 860 includes capturing the generated light waves having the third frequency component $f_{3.1}$. In an embodiment, the first imaging operation may be implemented using the first capture pixel 674 of the digital image capture device 616 described in conjunction with FIG. 7. A second imaging operation 870 includes capturing the generated light waves having the third frequency component $f_{3.2}$. In an embodiment, the second imaging operation may be implemented using the second capture pixel 774 of the digital image capture device 616 described in conjunction with FIG. 7. A conversion operation 880 includes digitizing the captured light waves having the third frequency component $f_{3.1}$ and the captured light waves having the third frequency $f_{3.2}$. In an embodiment, the conversion operation may be implemented using the digital image capture device 616 described in conjunction with FIG. 7. A communication operation 890 includes outputting in response to the digitized captured light waves an image responsive to the light waves frequency components $f_{1.1}$ and $f_{1.2}$ emanating from the object. In an embodiment, the communication operation may be implemented using the digital image capture device 616 described in conjunction with FIG. 7. The operational flow includes an end operation.

All references cited herein are hereby incorporated by reference in their entirety or to the extent their subject matter is not otherwise inconsistent herewith.

In some embodiments, "configured" or "configured to" includes at least one of designed, set up, shaped, implemented, constructed, or adapted for at least one of a particular purpose, application, or function. In some embodiments, "configured" or "configured to" includes positioned, oriented, or structured for at least one of a particular purpose, application, or function.

It will be understood that, in general, terms used herein, and especially in the appended claims, are generally intended as "open" terms. For example, the term "including" should be interpreted as "including but not limited to." For example, the term "having" should be interpreted as "having at least." For example, the term "has" should be interpreted as "having at least." For example, the term "includes" should be interpreted as "includes but is not limited to," etc. It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

In those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components.

With respect to the appended claims the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Use of "Start," "End," "Stop," or the like blocks in the block diagrams is not intended to indicate a limitation on the beginning or end of any operations or functions in the diagram. Such flowcharts or diagrams may be incorporated into other flowcharts or diagrams where additional functions are performed before or after the functions shown in the diagrams of this application. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus comprising:
    a metasurface configured to coherently upconvert incident light waves emanating from an object and having a first frequency $f_1$, the metasurface comprising:
        a substrate having a first negative-permittivity layer comprising a first plasmonic surface;
        a plasmonic nanoparticle having a base with a second negative-permittivity layer comprising a second plasmonic surface;
        a dielectric layer comprising a second-order nonlinear dielectric material disposed between the first plasmonic surface and the second plasmonic surface;
        wherein the metasurface is configured to form at least three plasmonic resonant modes in the dielectric layer, the at least three plasmonic resonant modes including a first plasmonic resonant mode having the first frequency $f_1$, a second plasmonic resonant mode having a second frequency $f_2$, and a third plasmonic resonant mode having a third frequency $f_3$; and
        wherein the metasurface is further configured to generate by a second order parametric process coherent light having the third frequency $f_3$ that is a sum of the first frequency $f_1$ and the second frequency $f_2$; and
    a second light propagation path from a source of pumped monochromatic coherent light waves having the second frequency $f_2$ to the metasurface; and
    a digital image capture device substantially transparent to light waves having the first frequency $f_1$ and configured to capture the generated light waves having the frequency $f_3$.

2. The apparatus of claim 1, further comprising:
    a first light propagation path transmitting the light waves emanating from the object and having the first frequency $f_1$ to the metasurface.

3. The apparatus of claim 1, further comprising:
    a third light propagation path transmitting the generated light waves having the third frequency $f_3$ from the metasurface to the digital image capture device.

4. The apparatus of claim 3, further comprising:
    a band block filter configured to block light at the second frequency $f_2$ and interposed in the third light propagation path between the metasurface and the digital image capture device.

5. The apparatus of claim 1, further comprising:
    a source of pumped monochromatic coherent light waves having the second frequency $f_2$ and optically coupled with the second light propagation path.

6. The apparatus of claim 1, further comprising:
    a lens configured to focus the light waves emanating from the object onto the metasurface.

7. The apparatus of claim 1, wherein the first plasmonic resonant mode frequency $f_1$ is spectrally separated from the second plasmonic resonant mode frequency $f_2$.

8. The apparatus of claim 1, wherein the first plasmonic resonant mode frequency $f_1$ is a function of a first characteristic of the plasmonic nanoparticle, the second plasmonic resonant mode frequency $f_2$ is a function of a second characteristic of the plasmonic nanoparticle, and the third plasmonic resonant mode frequency $f_3$ is a function of both the first characteristic of the plasmonic nanoparticle and the second characteristic of the plasmonic nanoparticle.

9. The apparatus of claim 1, wherein the first plasmonic resonant mode frequency $f_1$ is a function of a first side dimension of a non-square rectangular base of the plasmonic nanoparticle, the second plasmonic resonant mode frequency $f_2$ is a function of a second side dimension of the non-square rectangular base of the plasmonic nanoparticle, and the third plasmonic resonant mode frequency $f_3$ is a function of both the first side dimension of the non-square rectangular base of the plasmonic nanoparticle and the second side dimension of the non-square rectangular base of the plasmonic nanoparticle.

10. The apparatus of claim 1, wherein the plasmonic nanoparticle includes a base having (i) a first characteristic that establishes a first spatial mode at the first plasmonic resonant mode frequency $f_1$ and (ii) a second characteristic that establishes a second spatial mode at the second plasmonic resonant mode frequency $f_2$, the first spatial mode and the second spatial mode overlapping each other in the dielectric layer and creating the third plasmonic resonant mode having the third frequency $f_3$.

11. The apparatus of claim 1, wherein the first plasmonic resonant mode frequency $f_1$ and the second plasmonic resonant mode frequency $f_2$ are a function of the second-order nonlinear dielectric material disposed between the first plasmonic surface of the substrate and the second plasmonic surface of the plasmonic nanoparticle.

12. The apparatus of claim 1, wherein the digital image capture device is further configured to output an image responsive to the light waves emanating from the object.

13. The apparatus of claim 1, wherein the metasurface includes:
    a substrate having a first negative-permittivity layer comprising a first plasmonic surface;
    at least two plasmonic nanoparticles, each plasmonic nanoparticle of the at least two plasmonic nanoparticles having a respective base with a second negative-permittivity layer comprising a second plasmonic surface;
    the dielectric layer including a second-order nonlinear material disposed between the first plasmonic surface and the respective second plasmonic surface of each of the at least two plasmonic nanoparticles; and wherein the metasurface is configured to form at least three plasmonic resonant modes in the dielectric layer, the at least three plasmonic resonant modes including a first plasmonic resonant mode having the first frequency $f_1$, a second plasmonic resonant mode having a second frequency $f_2$, and a third plasmonic resonant mode having a third frequency $f_3$; and wherein the metasurface is further configured to generate by a second order parametric process coherent light waves having the third frequency $f_3$ that is a sum of the first frequency $f_1$ and the second frequency $f_2$.

14. The apparatus of claim 1, wherein both the substrate and the base of the plasmonic nanoparticle have a parallel planar geometry.

15. The apparatus of claim 1, wherein the metasurface includes a flat panel metasurface.

16. The apparatus of claim 1, wherein the metasurface includes a metasurface formed on a silicon chip.

17. The apparatus of claim 1, wherein the metasurface includes a metasurface on a chip integrated platform.

18. The apparatus of claim 1, wherein the apparatus includes on a chip integrated platform.

19. The apparatus of claim 1, wherein the metasurface includes an optically thin metasurface.

20. The apparatus of claim 1, wherein the base of the plasmonic nanoparticle is substantially conformal to the first plasmonic surface.

21. The apparatus of claim 1, wherein the base of the plasmonic nanoparticle is substantially planar.

22. The apparatus of claim 1, wherein the base of the plasmonic nanoparticle has a major side and a minor side shorter than the major side.

23. The apparatus of claim 1, wherein the plasmonic nanoparticle includes at least two joined or proximate plasmonic nanoparticles forming the base with a second negative-permittivity layer comprising the second plasmonic surface.

24. The apparatus of claim 1, wherein the plasmonic nanoparticle includes a nanorod having a non-square rectangular base with the second negative-permittivity layer.

25. The apparatus of claim 1, wherein the base of the plasmonic nanoparticle includes a rectangular, an ellipsoidal, or a triangular shaped base.

26. The apparatus of claim 1, wherein the base of the plasmonic nanoparticle has an arbitrary shaped base.

27. The apparatus of claim 1, wherein the base of the plasmonic nanoparticle has a major side length between about 1000 and about 5000 nm.

28. The apparatus of claim 1, wherein the base of the plasmonic nanoparticle has a major side length between about 1500 and about 4000 nm.

29. The apparatus of claim 1, wherein the base of the plasmonic nanoparticle has a minor side length between about 500 and about 2000 nm.

30. The apparatus of claim 1, wherein the dielectric layer includes a dielectric filled gap.

31. The apparatus of claim 1, wherein the dielectric layer includes a non-linear optical material having a non-linear response configured to enhance emissions at the third frequency $f_3$.

32. The apparatus of claim 1, wherein the plasmonic nanoparticle includes a doubly-resonant plasmonic nanoparticle.

33. The apparatus of claim 1, wherein the first negative-permittivity layer includes a metallic layer.

34. The apparatus of claim 1, wherein the first negative-permittivity layer includes a semiconductor layer.

35. The apparatus of claim 1, wherein the second negative-permittivity layer includes a noble metal.

36. The apparatus of claim 1, wherein the second negative-permittivity layer includes a metallic layer.

37. The apparatus of claim 1, wherein the second negative-permittivity layer includes a semiconductor layer or a polaritonic dielectric layer.

38. The apparatus of claim 1, wherein the dielectric layer is less than 100 nm thick.

39. The apparatus of claim 1, wherein the dielectric layer is less than 25 nm thick.

40. The apparatus of claim 1, wherein the dielectric layer is less than 2.5 nm thick.

41. An apparatus comprising:
a metasurface configured to coherently upconvert light waves emanating from an object and having a first frequency $f_1$, the metasurface comprising:
a substrate having a first negative-permittivity layer comprising a first plasmonic surface;
a plasmonic nanoparticle having a base with a second negative-permittivity layer comprising a second plasmonic surface;
a dielectric layer comprising a second-order nonlinear dielectric material disposed between the first plasmonic surface and the second plasmonic surface;
wherein the metasurface is configured to form at least three plasmonic resonant modes in the dielectric layer, the at least three plasmonic resonant modes including a first plasmonic resonant mode having the first frequency $f_1$, a second plasmonic resonant mode having a second frequency $f_2$, and a third plasmonic resonant mode having a third frequency $f_3$; and
wherein the metasurface is further configured to generate by a second order parametric process coherent light waves having the third frequency $f_3$ that is a sum of first frequency $f_1$ and the second frequency $f_2$;
a first light propagation path transmitting the light waves emanating from the object and having the first frequency $f_1$ to the metasurface;
a pumped laser outputting a monochromatic coherent light having the second frequency $f_2$;
a second light propagation path transmitting monochromatic coherent light having the second frequency $f_2$ from the pumped laser to the metasurface;
a digital image capture device substantially transparent to the light waves having the first frequency $f_1$, and configured to (i) capture the generated light waves having the third frequency $f_3$ and (ii) output an image responsive to the light waves emanating from the object; and
a third light propagation path transmitting the generated light waves having the third frequency $f_3$ from the metasurface to the digital image capture device.

42. A method comprising:
simultaneously receiving in a thin planar metasurface (i) light waves emanating from an object and having a first frequency $f_1$ and (ii) pumped monochromatic coherent light waves having a second frequency $f_2$;
non-linearly combining in the thin planar metasurface the light waves having the first frequency $f_1$ and the pumped monochromatic coherent light waves having the second frequency $f_2$;
generating in the thin planar metasurface by a second order parametric process coherent light waves having a third frequency $f_3$ that is a sum of the first frequency $f_1$ and the second frequency $f_2$;

digitizing the generated light waves having the frequency $f_3$; and outputting in response to the digitized generated light waves a digital image responsive to the light waves emanating from the object.

43. The method of claim 42, wherein the thin planar metasurface includes a thin planar metasurface having a subwavelength thickness relative to $f_1$ or $f_2$.

44. The method of claim 42, further comprising:

blocking light waves at the second frequency $f_2$ from reaching the digital image capture device.

\* \* \* \* \*